E. C. BALLMAN.
ELECTRICAL MEASURING INSTRUMENT.
APPLICATION FILED JULY 19, 1918.
1,428,743.  Patented Sept. 12, 1922.
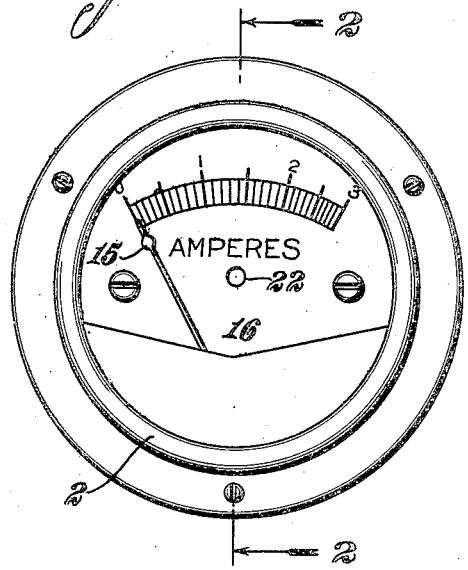
Fig. 1.
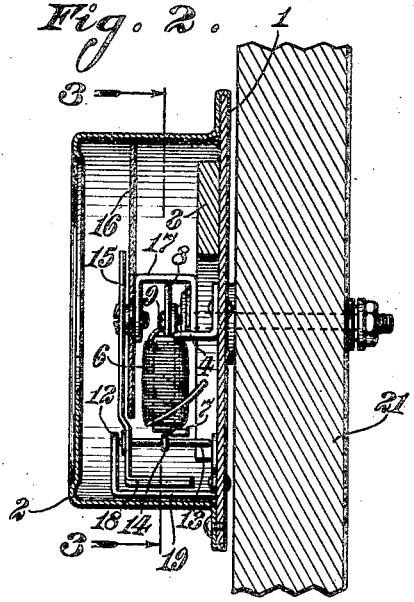
Fig. 2.
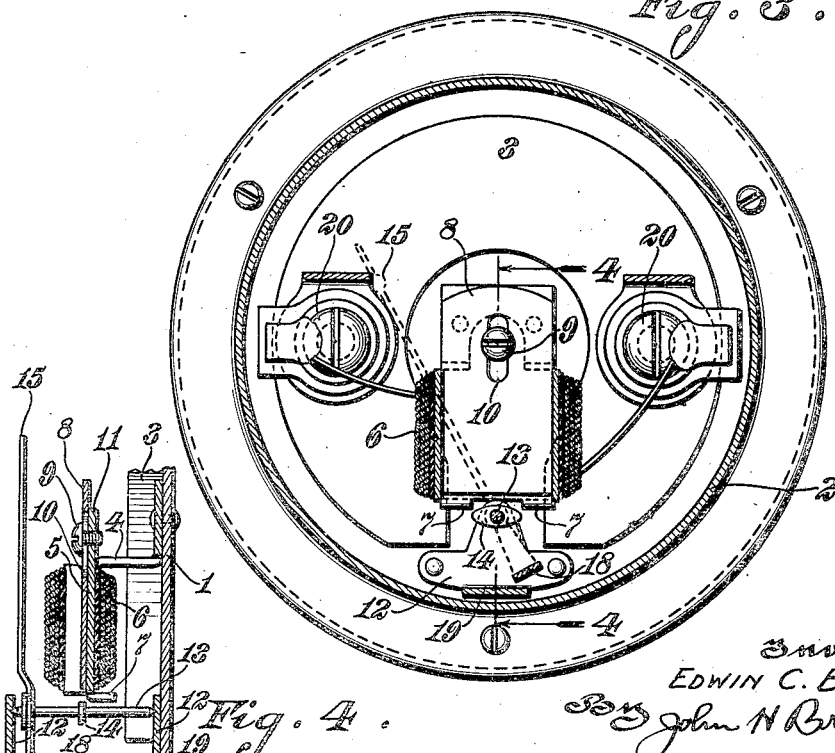
Fig. 3.
Fig. 4.
Inventor:
EDWIN C. BALLMAN,
By John N Bruninga
His Attorney.

Patented Sept. 12, 1922.

1,428,743

UNITED STATES PATENT OFFICE.

EDWIN C. BALLMAN, OF ST. LOUIS, MISSOURI, ASSIGNOR TO STAHL A. WHITTEN, OF ST. LOUIS, MISSOURI.

ELECTRICAL MEASURING INSTRUMENT.

Application filed July 19, 1918. Serial No. 245,737.

*To all whom it may concern:*

Be it known that I, EDWIN C. BALLMAN, a citizen of the United States, and residing at St. Louis, Missouri, have invented the new and useful Improvement in Electrical Measuring Instruments, of which the following is a specification.

This invention relates to electrical measuring instruments, and more particularly to instruments of the type in which a constant magnetic field and a magnetic field varying in accordance with the measured current, act upon a movable vane connected with the needle of the instrument to indicate the value of the measured current.

Some of the objects of this invention are to improve the construction of measuring instruments of the above type, so as to produce an instrument which is simple in construction, effective and accurate in its action, and cheap to manufacture.

Further objects will appear from the detail description taken in connection with the accompanying drawings in which, Figure 1 is a front elevation of an instrument embodying this invention;

Figure 2 is a section on the line 2—2, Figure 1;

Figure 3 is an enlarged section on the line 3—3, Figure 2; and,

Figure 4 is a section on the line 4—4, Figure 3.

Referring to the accompanying drawing, 1 designates a base of non-magnetic material, and 2 a case, also of non-magnetic material. Mounted on the base is a permanent magnet 3 of the horseshoe type. Mounted on the base between the arms of the permanent magnet is a bracket 4 of non-magnetic material, which has an extension 5, adapted to support the current carrying coil 6, with its axis parallel to the axis of the permanent magnet, so as to set up a magnetic field at right angles to the field set up by the permanent magnet. The extension 5 has prongs 7 bent downwardly to hold the coil 6 in position. Arranged within the coil is a soft iron core 8, which is adjustable longitudinally of the extension 5, and longitudinally of the axis of the coil, by a screw 9 passing through a slot 10 in the core, and threaded into a lug 11, projecting from the extension 5. In this way, the current carrying coil is supported laterally of the permanent magnet, but between the poles thereof.

Positioned on the base 1 is a bracket of non-magnetic material, having arms 12 forming bearings for a staff 13, positioned by these arms between the poles of the permanent magnet 3. Mounted on this staff is a vane 14 of soft iron, which is positioned opposite the core 8. Mounted also on this staff is a pointer 15 moving over a scale 16, mounted on a pair of non-magnetic brackets 17 on the base 1. The pointer 15 has an extension 18, which acts as a balancing weight. Bending this extension in or out adjusts the balance of the pointer. The connections through the coil are made through binding posts 20, which in this case are in the form of screws, adapted also for attaching the case to a main support 21.

Normally when no current flows on the coil 6, the vane 14 will be positioned with its long axis in the direction of the lines of force between the poles of the permanent magnet. When, however, current flows through the coil 6, this coil will set up a magnetic field in the core 8, at right angles to the field set up by the permanent magnet, and the resultant field will be the resultant of these two fields which will act upon the vane to position it, and thereby position the pointer on the scale. By adjusting the soft iron core 8 towards and from the vane 14, the effect on the current carrying coil can be varied so as to permit accurate adjustment of the instrument in the calibration of the same. In order to permit such adjustment, the dial 16 is provided with an opening 22, which opening is opposite the head of the screw 9.

It is obvious that various changes may be made in the details without departing from the spirit of this invention. It is therefore, to be noted that this invention is not to be limited to the specific construction shown and described.

Having thus described the invention, what is claimed is:

1. An electrical measuring instrument, comprising a base, a permanent horse-shoe magnet on said base, a current-carrying coil adapted to set up a magnetic field at an angle to the field of said permanent magnet, a movable vane adapted to be influenced by said fields, a support for said coil mounted on said base, and a core for said coil, mounted on and guided by said support and adjustable relatively to said vane.

2. An electrical measuring instrument, comprising, a base, a permanent horse-shoe magnet on said base, a current-carrying coil adapted to set up a magnetic field at an angle to the field of said permanent magnet, a movable vane adapted to be influenced by said fields, a support for said coil mounted on said base and positioned between the legs of said permanent magnet, and a core for said coil, mounted on and guided by said support and adjustable relatively to said vane.

In testimony whereof I affix my signature this 10th day of Sept., 1917.

EDWIN C. BALLMAN.